July 22, 1969   H. F. PRASSE ETAL   3,456,952
COMPRESSION PISTON RINGS
Filed Sept. 23, 1965   2 Sheets-Sheet 1
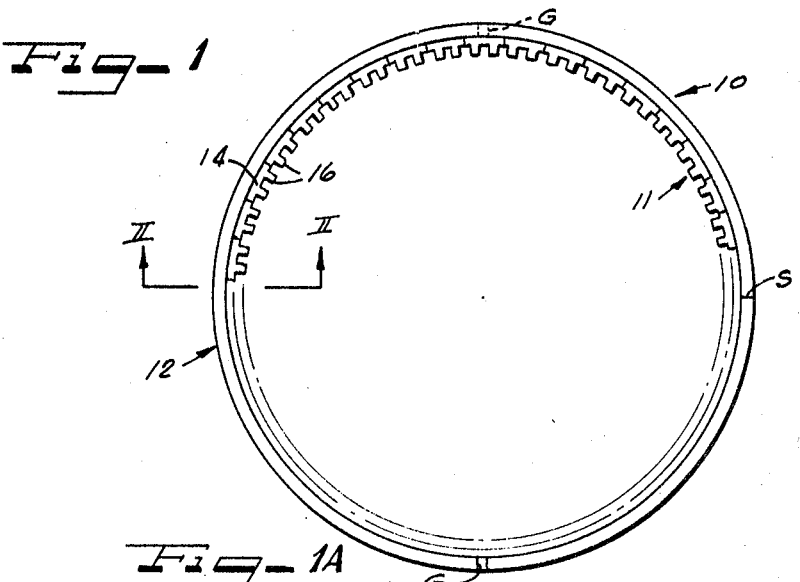
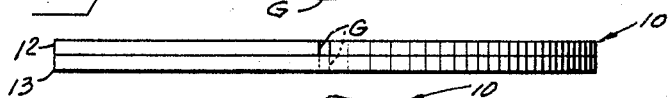
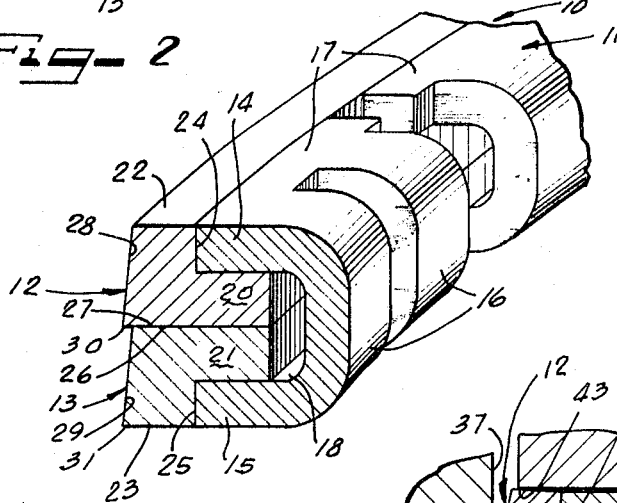
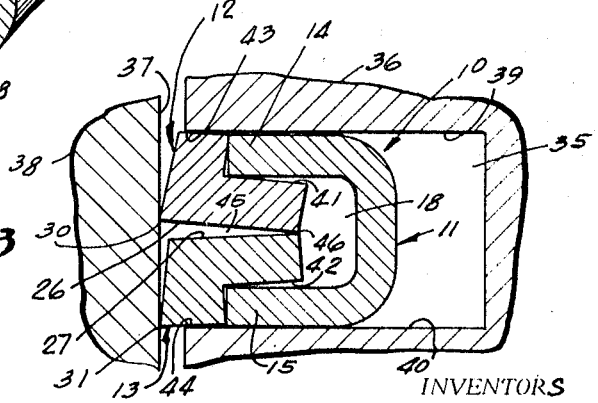
INVENTORS
HERBERT F. PRASSE
DONALD J. MAYHEW
BY *[signature]* ATTORNEYS

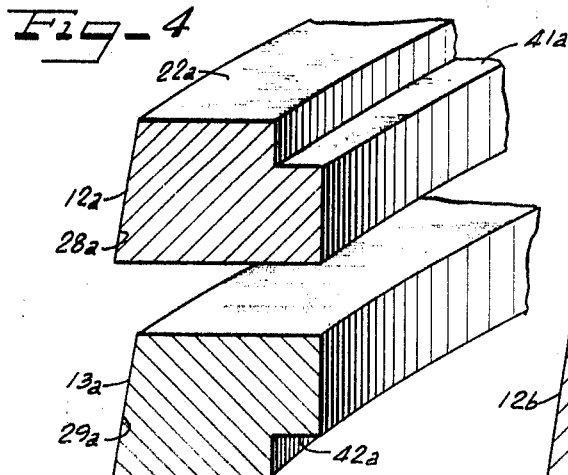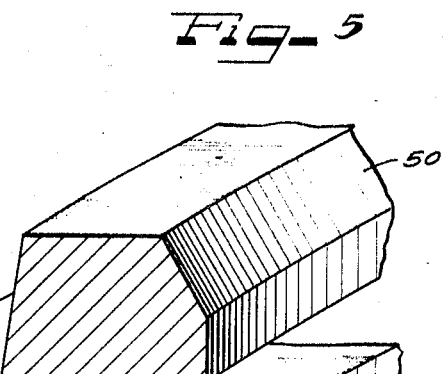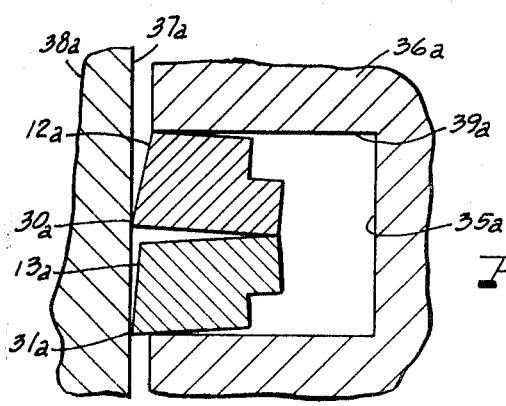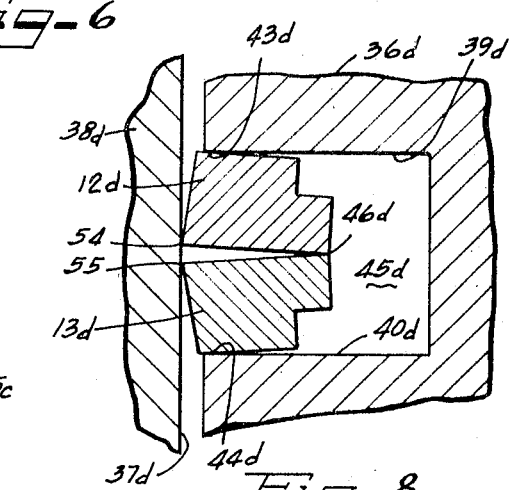
INVENTORS
HERBERT F. PRASSE
DONALD J. MAYHEW
BY Hill, Sherman, Meroni, Gross & Simpson ATTORNEYS United States Patent Office 3,456,952
Patented July 22, 1969

3,456,952
COMPRESSION PISTON RINGS
Herbert F. Prasse, Town and Country, and Donald J. Mayhew, Manchester, Mo., assignors to Ramsey Corporation, St. Louis, Mo., a corporation of Ohio
Filed Sept. 23, 1965, Ser. No. 489,477
Int. Cl. F16j 15/00, 9/00; B65d 53/00
U.S. Cl. 277—140          13 Claims

ABSTRACT OF THE DISCLOSURE

A compression piston ring assembly for use in the upper groove of a piston of an internal combustion engine, wherein the piston ring assembly comprises a pair of associated piston ring segments for mounting in the groove in superimposed relationship and so arranged and constructed as to provide a seal against the upper and lower radial walls of the groove at or near the outer periphery thereof to thereby prevent or reduce blow-by. The outer cylinder wall-engaging faces of the piston ring segments are tapered or curved, and the cross-section of the ring segments is unbalanced to cause twisting or dishing of the ring segments, thereby providing substantially edge contact only between the outer faces of the ring segments and the cylinder wall.

---

This invention relates to a compression piston ring assembly for use in the upper groove of a piston of an internal combustion engine. More particularly, the invention relates to a compression ring assembly which provides effective sealing against the upper and lower radial walls of the piston groove for low emission engines and constitutes an improvement over the piston ring described and claimed in U.S. Patent No. 2,729,524, dated Jan. 3, 1956, issued to one of us.

In accordance with the present invention, our piston ring assembly consists essentially of a pair of associated piston ring segments for mounting in the upper inwardly closed groove of the piston of an internal combustion engine, and so arranged and constructed as to provide sealing against the upper and lower radial walls of the groove at or near the outer periphery thereof. This result is accomplished in a number of ways, in accordance with one of which the outer, cylinder wall-engaging faces of the piston ring segments are tapered or curved either in the same or in opposite directions, either with or without a concomitant unbalancing of the cross-section of ring segments to cause twisting or dishing of the ring segments, thereby to provide substantial edge contact between the outer faces and the cylinder wall; and in another of which, the respective ring segments of the pair of segments are straight faced but by reason of unbalanced cross-section constitute positive and reverse torsion rings. In all of these types of piston ring assemblies, each of the ring segments in its initial, free, or uncontracted state has upper and lower planar surfaces, the lower surface of the upper ring segment, when assembled in a piston ring groove, being in opposed and abutting relation to the upper surface of the lower ring segment, but with said two surfaces free within limits to become axially separated toward their outer peripheries when installed and the engine is operating.

As in the above cited patent, a spring-hardened sheet metal, flexible, circumferentially expanding, U-shaped ring can be used, similar to the ring 10 of that patent, for maintaining the pair of compression ring segments, rather than the single ring 12 of that patent, in assembled relationship. Alternatively, the flexible circumferentially expanding ring can be omitted in accordance with our present invention and the pair of ring segments assembled directly and by themselves in the upper groove of a piston.

It is, then, an object of this invention to provide a compression piston ring assembly which provides sealing against the upper and lower sides of the piston groove at the outer periphery of said groove when installed; that provides good bore conformability and piston groove side sealing; that provides edge sealing at the outer periphery with the cylinder wall, either at the lower edges of the respective pair of ring segments or at the lower and upper edges, respectively, of the upper and lower ring segments of the pair; and that because of the aforesaid features compensates for misalignment of the piston ring groove with respect to the cylinder wall.

Other and further objects of this invention will be apparent to those skilled in the art from the following detailed description of the annexed sheets of drawings, which, by way of preferred example only, illustrate embodiments of our invention, but with features of taper exaggerated for clarity of illustration.

On the drawings:

FIG. 1 is a plan view of a compression piston ring assembly embodying one form of our invention;

FIG. 1A is an edge elevational view of the assembly of FIG. 1;

FIG. 2 is an enlarged fragmentary view taken substantially along the line II—II of FIG. 1;

FIG. 3 is an enlarged fragmentary sectional view, similar to that of FIG. 2, but with the compression piston ring assembly of FIGS. 1 and 2 mounted in an upper groove of a piston and installed within the cylinder of an engine;

FIG. 4 is an enlarged, fragmentary cross-sectional view of a compression ring assembly consisting of a positive torsion and a reverse torsion piston ring segment, without the sheet metal flexible circumferentially expanding ring illustrated in FIGS. 1 to 3, inclusive;

FIG. 5 is an enlarged, fragmentary cross-sectional view of a modified form of compression piston ring segments utilizing chamfers instead of counterbores, such as used in FIG. 4, to obtain the unbalance in cross-section which causes the rings to twist, or dish, upon assembly in an engine;

FIG. 6 is a fragmentary cross-sectional view of an assembly of tapered faced ring segments within the groove of a piston installed in the cylinder of an internal combustion engine;

FIG. 7 is a fragmentary, cross-sectional view, similar to FIG. 6, but showing a modified form of compression piston ring assembly consisting of ring segments having arcuate-faced ring segments in association with a flexible circumferentially expanding ring; and FIG. 8 is a fragmentary, cross-sectional view, similar to that of FIG. 7, but showing a further modified form of compression piston ring made up of taper-faced torsion ring segment providing center contact with the cylinder wall.

As shown on the drawings:

In FIGS. 1 to 3, inclusive, the compression piston ring assembly, generally indicated by the reference numeral 10, included an inner spring-hardened, sheet metal, flexible, circumferentially expanding U-shaped piston ring 11 of the type normally used to control oil flow, together with a pair of compression piston ring segments 12 and 13, each preferably formed of solid cast metal, such as normally used for compression rings, with said ring segments 12 and 13 and said flexible circumferentially expanding piston ring 11 in assembled relationship. Said ring 11 is provided with a transverse split, as at S, which is substantially closed, while the ring segments 12 and 13 are provided with splits that result in gaps G that are open and circumferentially separated by an angle, preferably, 180° from one another. The ring 11 is circumferentially expansible so that, when radially compressed, it forms a loaded spring exerting an equally distributed expanding force on the pair of ring segments 12 and 13. This expanding force or load acts in a radial direction, and since the ring 11 is very flexible, it can follow any irregularities in the assembly in which it is mounted.

The ring 11 is composed of axially spaced top and bottom flanges 14 and 15, respectively, connected by circumferentially spaced web members 16. The top flange 14 is composed of a plurality of arcuate crowns or segments 17, while the lower flange 15 is composed of similar arcuate crowns or segments (not shown) but in staggered relation to the crowns or segments 17. For further details of the construction of the circumferentially expansible ring 11 reference is made to the aforesaid Patent No. 2,729,524.

Said ring 11 defines a channel 18 that is open at the outer peripheral portion of the U-shaped ring 11. The ring segments 12 and 13 are, in general, L-shaped in cross-section, with the leg portions 20 and 21 of the respective rings positioned within said channel 18 and with the heads 22 and 23 of said respective ring segments abutting the outer peripheral end faces of said U-shaped ring 11, as at 24 and 25, respectively. As manufactured, and in their initial uncontracted state, the upper segment of the pair of ring segments is provided with a lower planar face 26 and the lower ring segment 13 is provided with an upper planar face 27. When the ring segments 12 and 13 are assembled in the ring 11, prior to installation in a piston groove, the planar surfaces 26 and 27 are in extended surface abutting relationship. When so assembled, due to the tapers of the outer peripheral faces 28 and 29 of the respective ring segments 12 and 13, the lower outer edge 30 of said upper ring segment 12 extends radially outwardly of and overhangs the outer peripheral face 29 of the lower ring segment 13. The outer peripheral face of said ring segment 13 being similarly tapered to the outer peripheral face of the upper ring segment 12, the lower outer edge 31 of said lower segment 13 lies in the same surface of revolution as that of the edge 30.

However, when the compression ring assembly 10 is installed, as illustrated in FIG. 3, in operative relationship within an upper closed groove 35 of a piston 36 that is operating within a cylinder 37 of an internal combustion engine 38, there is sufficient clearance, or play, between the circumferentially expandable ring 11 and the upper and lower radial surfaces 39 and 40, respectively, of the groove 35, to permit the ring segments 12 and 13 to assume the twisted or cocked positions illustrated in FIG. 3. When in such twisted positions, the previously planar surfaces 26 and 27 become frusto-conical. The tendency of the ring segments 12 and 13 to assume such twisted or "dished" relationships is due to the unbalanced cross-section of said segments that is caused by the counterboring, as at 41 and 42, of said segments 12 and 13, respectively, that brings said segments into a generally L-shape in cross-section. This unbalanced cross-section results in the upper ring segment 12 assuming a twist or "dish" in a clockwise direction, and in the case of the lower ring segment 13, causes that segment to twist in a counterclockwise direction (when viewing FIG. 3). Such twisting causes a seal to be formed between the outer periphery of the piston ring groove 35 at the outer edge of said radial surface 39, as at 43, and also a seal at the outer edge of the lower radial surface 40, as at 44. Additionally, the relative twisting of the ring segments 12 and 13 causes a partial separation of said lower surface 27 and upper surface 26 of the respective rings, as at 45, while leaving said surfaces 27 and 26 still in abutting relation at the rear edges of said respective ring segments, as at 46.

The net result of the initial tapering of the surfaces 28 and 29 (FIG. 2) and the twisted or cocked relationship of the ring segments 12 and 13, when actually installed and in operation (FIG. 3), is to accentuate the tapered relationship between the end faces 28 and 29 to the cylinder wall 37, whereby contact therebetween is solely sharp edgewise contact between the edges 30 and 31 and said cylinder wall 37. Thus, in addition to good sealing of ring segments 12 and 13 against the upper and lower radial surfaces of the piston groove at the outer periphery of said groove, there is also good sealing between the end edges 30 and 31 and the wall of the cylinder because of the good bore conformability provided by the resilient nature of the ring segments 12 and 13 and of the circumferentially expansible ring 11.

FIGS. 4 and 5 illustrate pairs of torsion type ring segments, separate and apart from the circumferentially expansible U-shaped ring 11. In FIG. 4, the ring segments corresponding to segments 12 and 13 are given the same reference numerals, but with the subscript $a$, while in FIG 5 the corresponding ring segments are given the subscript $b$. In FIG. 4, the ring segments 12$a$ and 13$a$ have counterbores 41$a$ and 42$a$, respectively, that are similar to the counterbores 41 and 42, but of lesser diameter. The unbalanced cross-section of said ring segments, however, is sufficient to bring about a twisting action when the ring segments are confined to truly cylindrical form, as by installation within the bore of a cylinder. The upper ring segment 12$a$ is a positive type torsion ring, while the lower ring segment 13$a$ is a negative, or reverse, type torsion ring. When installed in a closed groove of a piston, as illustrated in FIG. 6, the ring segments 12$a$ and 13$a$ assume the relationship there illustrated. Essentially, there is no different result or function from the result and function already described in connection with FIGS. 1 to 3, inclusive, the omission of the circumferentially expansible U-shaped ring 11 notwithstanding. It will be understood, however, that said ring 11 could be employed with the ring segments 12$a$ and 13$a$ in the same manner as illustrated in FIGS. 1 to 3 inclusive. The use of the ring 11, of course, serves a useful purpose in that it facilitates the handling of the pairs of rings by holding them in assembled relationship, as in FIG. 2, prior to installation in the internal combustion engine.

Also, the U-shaped ring 11, or an equivalent ring serves as an expander to assure better conformability to the cylinder wall by exerting uniform outward radial pressure on the rings. In certain engines, where cylinder bore distortion is not a problem, or when cost of rings is a major factor, the piston rings would be "live" rings and would necessarily be of a larger cross-section than they otherwise would be, to provide inherent resilient pressure against the cylinder bore wall. With the circumferentially expansible ring 11, or its equivalent, "dead" piston rings or ring segments could be used, that is, rings having no inherent resiliency that would result in radial and circumferential expansion of the rings per se.

In FIG. 5, the ring segments 12$b$ and 13$b$ are provided with chamfers 50 and 51, respectively, instead of the counterbores 41$a$ and 42$a$ of FIG. 4, to obtain the unbalancing cross-section which causes the ring segments to twist upon assembly. Ring segment 12$b$ is a positive and ring segment 13$b$ a reverse torsion ring. The ring segments 12$b$ and 13$b$ can be assembled in the same manner as the segments 12$a$ and 13$a$ without a circumferentially expansible U-shaped ring (FIG. 6), or can be assembled the same as segments 12 and 13 in a circumferentially expansible U-shaped ring like the ring 11 (FIG. 2).

FIG. 7 discloses a compression ring assembly installed in an internal combustion engine, but using a slightly different form of ring segments. Corresponding elements of FIG. 7 will be given the same reference numerals and the subscript $c$. The upper ring segment 12$c$ is otherwise similar to the ring segment 12 (FIGS. 2 and 3), but is provided with an outer surface 28$c$ that is arcuate in cross-section. Similarly, the lower ring segment 13$c$ is provided with an outer surface 29c that is arcuate in cross-section. By virtue of the unbalanced cross-section of the ring segments 12c and 13c and their dimensions, the resulting twist of the ring segments in installed position accentuates the center contact that would inherently occur because of the arcuate or tapered configuration of the surfaces 28c and 29c between the piston ring assembly and the cylinder wall. Such center contact is constituted by the outer lower edge 52 of the upper ring segment 12c and the outer upper edge 53 of the lower ring segment 13c engaging with the cylinder wall 37c. Such edge contacts compensate for piston groove misalignment and assure center face contact when misalignment due to piston clearances and machine tolerances is present. Actually the angle of taper of the outer surfaces 28c and 29c is of the order of 1 to 2° depending upon the direction of torsion, reverse torsion rings effecting a higher degree of taper than positive torsion rings.

FIG. 8 illustrates a further modified form of our compression piston ring assembly. Corresponding elements to those already described are indicated in FIG. 8 by the reference numeral and the subscript d. The ring segments 12d and 13d are similar to the ring segments 12a and 13a (FIG. 6), except that the outer peripheral surfaces of said ring segments are not initially tapered. Because of the unbalanced cross-section of said ring segments 12d and 13d, however, the segments assume the twisted or cocked relationship illustrated in FIG. 8, wherein the outer lower edge 54 of the upper ring segment 12d and the upper outer edge 55 of the lower ring segment 13d establish edgewise center contact with the cylinder wall 37d. As in the case of the modification of our invention illustrated in FIG. 7, the center sealing edge contacts at 54 and 55 are slightly spaced along the axial length of the cylinder wall 37d, but the upper and lower ring segments 12d and 13d, respectively, are still in abutting relationship along their rear edges as at 46d, and there is sealing contact toward the outer ends of the radial surfaces 39d and 40d of the groove 35d, as at 33d and 44d, the same as has been previously described.

It will be apparent from the foregoing description that in each case, whether the outer peripheral surfaces of the ring segments are initially tapered, or not, so long as the cross-sections of the upper and lower ring segments are unbalanced, edgewise sealing contact between the ring segments and the cylinder wall will be effected, either at the lower or upper, respective, outer surfaces of said ring segments, as in FIGS. 2, 3 and 6, or at the center portions of said rings, as in FIGS. 7 and 8. In each form of our invention, also, sealing contact is effected between the ring segments and the radial planar walls of the groove of the piston adjacent the forward ends thereof.

As already explained, the compression piston rings of our invention may be installed in pairs of ring segments with or without a circumferentially expansible U-shaped ring. As a result of such sealing action, the compression piston ring assembly of our invention provides good bore conformability and piston groove side sealing and compensates for misalignment of the piston ring groove with respect to the cylinder wall. Consequently, our compression piston ring assembly can be effectively used with low emission engines, since the aforesaid novel features or our assembly substantially eliminate any blow-by of gases and vapors.

While the compression piston rings having tapered outer faces and providing for end or edgewise sealing against the cylinder wall have been disclosed in Patent No. 2,240,624, dated May 6, 1941, the present invention distinguishes from that patent in that it eliminates the thin, helical ring element there indicated by the reference numeral 4 and nested between the tapered face ring elements 3. Furthermore, the piston ring assembly of the cited patent does not result in the novel sealing features and conformability here present. Instead, the entire ring combination of the patent is free to float with the oil film serving as the buoyant medium, due to the clearance provided to prevent side sealing against the radially extending upper and lower walls of the ring groove.

It will be understood that modifications and variations may be effected without departing from the scope of the novel concepts of the present invention.

We claim as our invention:

1. A compression ring assembly for mounting in a radially inwardly closed annular groove of a piston that operates in a cylinder of an internal combustion engine, said assembly comprising a pair of separate, transversely split, radially expansible ring segments freely received in superimposed relationship in said groove with limited freedom of axial movement therein, said ring segments having radially extending surfaces including one pair of abutting surfaces and a second pair of surfaces confronting and abutting corresponding radially extending walls of said groove, said ring segments also having outer peripheral surfaces for edgewise engagement with the wall of said cylinder, and said ring segments having radially inner relieved walls producing an unbalanced cross-section such as to cause said ring segments when confined to truly circular configuration to become twisted and assume an oppositely dished relationship with said one pair of confronting surfaces in spaced relationship at their radially outward edges and converging into abutting relationship at their radially inward edges.

2. A compression ring assembly as defined by claim 1, wherein
at least one of said outer peripheral surfaces is initially tapered throughout its axial extent.

3. A compression ring assembly as defined by claim 1, wherein
both of said outer peripheral surfaces are initially tapered throughout their axial extents.

4. A compression ring assembly as defined by claim 3, wherein
both of said outer peripheral surfaces are similarly tapered in the same axial direction to provide radially outwardly projecting lower edges.

5. A compression ring assembly as defined by claim 1, wherein
both of said outer peripheral surfaces present an arcuate profile in cross-section.

6. A compression ring assembly for mounting in an annular radially inwardly closed groove of a piston that operates in a cylinder of an internal combustion engine, said assembly comprising a flexible circumferentially expansible, transversely split ring of resilient metal, said ring having radially extending flanges and peripherally spaced web members connecting radially inward portions of said flanges and forming a U-shape therein providing an outwardly opening channel, a pair of radially expansible split ring segments mounted in superimposed relationship within said channel for retention therein subject to expansion by said ring, said ring segments having radially extending surfaces including one pair of abutting surfaces and another pair of surfaces engaged by said flanges, said ring segments having radially inner relieved walls producing an unbalanced cross-section such as to cause said ring segments when confined to a truly circular configuration to twist and assume an oppositely dished relationship in an axial direction, and said ring segments having outer peripheral surfaces for edgewise engagement with said cylinder wall, whereby when said assembly of said circumferentially expansible ring and of said ring segments is mounted in said closed groove and said piston is in operative position in said cylinder said ring segments are caused to be oppositely dished and to present edge-wide contact only between said outer peripheral surfaces and said cylinder wall.

7. A compression ring assembly defined by claim 6, wherein
each of said ring segments is of L-shape in cross-section and the segments are superimposed with their leg portions, within said channel and with their head portions abutting the radially outwardly end portions of said flanges.

8. A compression ring assembly as defined by claim 6, wherein
said outer peripheral surfaces are both intially tapered throughout their axial extents to provide radially outwardly projecting lower edges.

9. In combination with a piston of an internal combustion engine in a cylinder bore in which the piston is operatively disposed, said piston having an inwardly closed upper groove formed with planar radially extending upper and lower surfaces,
a pair of superimposed torsion ring segments disposed in said groove in oppositely dished relationship, said ring segments being in abutting relationship only at their radially inner portions and having only edgewise contact with the wall of said cylinder bore and having sealing contact with radially outward portions of the planar radially extending upper and lower surfaces of said groove.

10. The combination defined by claim 9, wherein said ring segments have outer peripheral surfaces tapered in opposite directions.

11. The combination defined by claim 9, wherein one of said ring segments is a positive and the other is a reverse torsion ring.

12. The combination defined by claim 9, wherein both of the ring segments have tapered outer peripheral faces tapered in the same direction.

13. The combination defined by claim 9, wherein both of the ring segments have arcuate outer peripheral faces to provide axially spaced edge contacts with said cylinder bore wall.

References Cited

UNITED STATES PATENTS

| 1,340,650 | 5/1920 | Devanek | 277—194 |
| 2,213,452 | 9/1940 | Paton | 277—176 |
| 2,459,395 | 1/1949 | Smith | 277—216 |
| 2,970,023 | 1/1961 | Thompson | 277—216 X |
| 3,031,240 | 4/1962 | Olsen | 277—176 X |

FOREIGN PATENTS

| 140,799 | 7/1949 | Australia. |
| 918,909 | 10/1954 | Germany. |
| 1,008,072 | 5/1957 | Germany. |
| 1,099,812 | 2/1961 | Germany. |

LAVERNE D. GEIGER, Primary Examiner

JEFFREY S. MEDNICK, Assistant Examiner

U.S. Cl. X.R.

277—141, 169, 173, 194